United States Patent
Morrison et al.

(10) Patent No.: US 9,623,493 B2
(45) Date of Patent: Apr. 18, 2017

(54) DOUBLE-SIDED BALL END MILL CUTTING INSERT AND TOOL THEREFOR

(75) Inventors: Michael G. Morrison, Tarrs, PA (US); Srikanth Bontha, Monroeville, PA (US)

(73) Assignee: KENNAMETAL INC., Latrobe, PA (US)

( * ) Notice: Subject to any disclaimer, the term of this patent is extended or adjusted under 35 U.S.C. 154(b) by 1111 days.

(21) Appl. No.: 12/273,774

(22) Filed: Nov. 19, 2008

(65) Prior Publication Data

US 2010/0124465 A1    May 20, 2010

(51) Int. Cl.
B23C 5/10    (2006.01)
B23C 5/22    (2006.01)

(52) U.S. Cl.
CPC .......... B23C 5/1045 (2013.01); B23C 5/2221 (2013.01); B23C 2200/128 (2013.01); B23C 2200/203 (2013.01); B23C 2210/168 (2013.01); B23C 2250/12 (2013.01); Y10T 407/1924 (2015.01); Y10T 407/235 (2015.01)

(58) Field of Classification Search
CPC ............................ B23C 5/1045; B23C 5/2221
USPC .................... 407/34, 40, 37, 41, 53, 113, 54
See application file for complete search history.

(56) References Cited

U.S. PATENT DOCUMENTS

| | | | |
|---|---|---|---|
| 3,341,923 A | | 9/1967 | Kelm |
| 3,343,431 A | | 9/1967 | Boyer |
| 3,354,526 A | | 11/1967 | Erkfritz |
| 4,050,127 A | * | 9/1977 | Bodem et al. ................. 407/107 |
| 4,220,429 A | * | 9/1980 | Powers et al. ................. 408/224 |
| 4,252,480 A | * | 2/1981 | Mizuno et al. ................. 408/223 |
| 4,525,110 A | * | 6/1985 | Stojanovski .................... 407/40 |
| 4,566,828 A | | 1/1986 | Reinauer |
| 4,658,875 A | | 4/1987 | Grabovac |
| 4,729,697 A | * | 3/1988 | Lacey ............................ 407/42 |
| 4,834,591 A | * | 5/1989 | Tsujimura et al. ........... 407/113 |
| 4,883,391 A | * | 11/1989 | Tsujimura et al. ............ 407/40 |
| 4,898,499 A | * | 2/1990 | Tsujimura et al. ............ 407/42 |
| 4,919,573 A | * | 4/1990 | Tsujimura et al. ............ 407/40 |
| 4,927,303 A | * | 5/1990 | Tsujimura et al. .......... 408/223 |

(Continued)

FOREIGN PATENT DOCUMENTS

| | | |
|---|---|---|
| CN | 1761547 | 4/2006 |
| CN | 101505895 | 8/2009 |

(Continued)

Primary Examiner — Jennifer Swinney
(74) Attorney, Agent, or Firm — Matthew S. Bedsole

(57) ABSTRACT

A double-sided ball end mill includes a body having a generally hemispherical forward end portion and a rearward end portion. The forward end portion includes insert-receiving pockets and chip pockets. A cutting insert can be mounted within each insert-receiving pocket. The cutting insert includes a first substantially planar surface, a second substantially planar surface, a first curvilinear side surface, a second curvilinear side surface, a first pair of cutting edges formed at an intersection between the first substantially planar surface and the first and second curvilinear side surfaces, and a second pair of cutting edges formed at an intersection between the second substantially planar surface and the first and second curvilinear side surfaces. The first and second planar surfaces are substantially parallel to each other, and the cutting insert is mirror symmetric about all three axes.

11 Claims, 6 Drawing Sheets

(56) References Cited

U.S. PATENT DOCUMENTS

| | | | |
|---|---|---|---|
| 4,979,849 A | 12/1990 | Kezran | |
| 5,004,378 A | 4/1991 | Arai | |
| 5,017,055 A * | 5/1991 | Tsujimura et al. | 407/113 |
| 5,167,473 A * | 12/1992 | Barnett | 407/104 |
| 5,221,162 A * | 6/1993 | Okawa | 407/40 |
| 5,333,972 A * | 8/1994 | Bernadic et al. | 407/113 |
| 5,443,334 A * | 8/1995 | Pantzar | 407/113 |
| 5,586,845 A * | 12/1996 | Arai | B23C 5/2221 |
| | | | 407/113 |
| 5,685,670 A * | 11/1997 | Satran | 407/42 |
| 5,772,365 A | 6/1998 | Vogel et al. | |
| 5,893,683 A * | 4/1999 | Johnson | 407/42 |
| 5,904,448 A * | 5/1999 | Lee et al. | 407/42 |
| 5,951,213 A | 9/1999 | Fauser et al. | 407/35 |
| 6,126,366 A * | 10/2000 | Lundblad | 407/102 |
| 6,149,355 A * | 11/2000 | Fouquer et al. | 407/113 |
| 6,409,435 B1 | 6/2002 | Kocherovsky | |
| 6,607,334 B2 * | 8/2003 | Satran et al. | 407/35 |
| 6,840,716 B2 * | 1/2005 | Morgulis et al. | 407/34 |
| 7,004,689 B2 * | 2/2006 | DeRoche et al. | 407/48 |
| 7,118,312 B2 * | 10/2006 | Norstrom et al. | 407/113 |
| 7,241,082 B2 * | 7/2007 | Smilovici et al. | 407/113 |
| 7,322,776 B2 | 1/2008 | Webb | |
| 7,387,474 B2 | 6/2008 | Edler | |
| 7,419,336 B2 | 9/2008 | Lehto | |
| 7,794,182 B2 | 9/2010 | Lehto | |
| 7,931,425 B2 | 4/2011 | Morrison | |
| 8,858,126 B2 | 10/2014 | Morrison | |
| 2006/0056926 A1 | 3/2006 | Riviere et al. | |
| 2006/0210364 A1 * | 9/2006 | Bellmann et al. | 407/40 |
| 2006/0275088 A1 * | 12/2006 | Lehto et al. | 407/40 |
| 2007/0177951 A1 | 8/2007 | Sakamoto | |
| 2007/0245535 A1 | 10/2007 | Noggle | |
| 2008/0138162 A1 | 6/2008 | Webb | |
| 2010/0124465 A1 | 5/2010 | Morrison | |
| 2011/0076106 A1 | 3/2011 | Morrison et al. | |

FOREIGN PATENT DOCUMENTS

| | | | |
|---|---|---|---|
| DE | 3740814 | 6/1989 | |
| EP | 361435 A2 * | 4/1990 | |
| EP | 362171 A2 * | 4/1990 | B23B 27/14 |
| EP | 504608 A1 * | 9/1992 | B23C 5/10 |
| EP | 599393 | 2/1996 | |
| EP | 842723 A1 * | 5/1998 | B23C 5/10 |
| GB | 2070472 | 9/1981 | |
| JP | 53049390 | 4/1978 | |
| JP | 54093284 | 7/1979 | |
| JP | 03123613 | 12/1991 | |
| JP | 07276128 A * | 10/1995 | |
| JP | 200319619 | 1/2003 | |
| JP | 2003251514 A * | 9/2003 | B23C 5/10 |
| JP | 2003275920 | 9/2003 | |
| JP | 2005186271 A * | 7/2005 | B23C 5/20 |
| WO | 03-004204 A1 | 1/2003 | |
| WO | 03000450 | 1/2003 | |
| WO | 2008044115 | 4/2008 | |

* cited by examiner

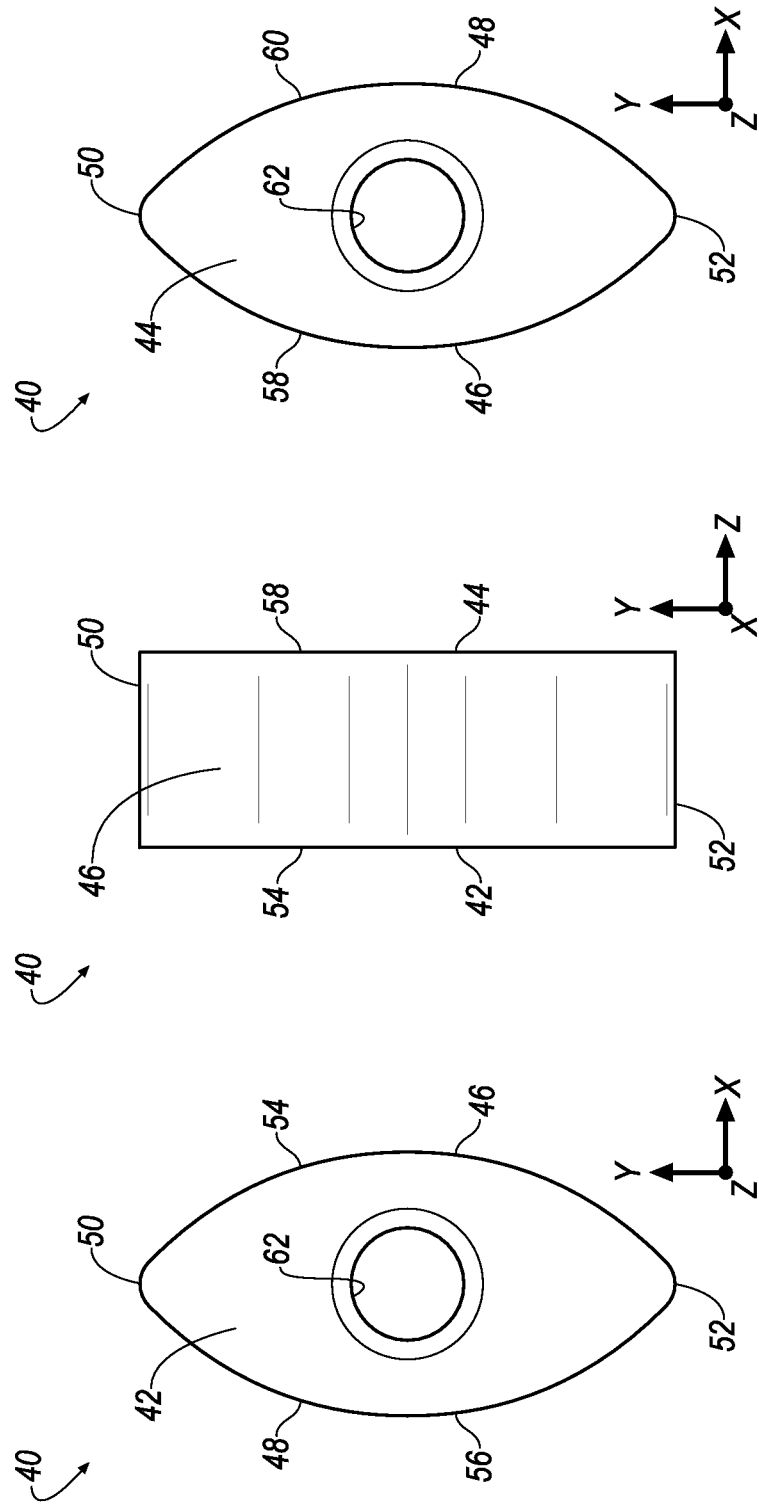

DOUBLE-SIDED BALL END MILL CUTTING INSERT AND TOOL THEREFOR

BACKGROUND OF THE INVENTION

The invention relates in general to a cutting insert for a ball end mill, and in particular, to a double-sided cutting insert for a ball end mill having four cutting edges that can cut in any direction without the requirement of error proofing when the cutting insert is mounted on the ball end mill.

Ball nose end mills are used in many metal working applications including mold making where the inherent strength and milling advantages of a fully radiused cutting edge for the copy milling of a mold cavity is best demonstrated. Its ball shape allows the end mill to attack the mold cavity from any angle or direction. The cutting edge when generated through the end of the ball mill becomes helical with rotation. This promotes shearing of the metal to be cut in an efficient manner.

A conventional ball nose end mill includes a generally cylindrical end mill body having a generally hemispherical forward end portion. Two insert-receiving seats or recesses are formed in the forward end portion, diametrically opposite to each other. Two indexable cutting inserts are mounted in the two seats and secured thereto by means of clamp screws.

Ball nose end mills have proven to be highly versatile machine tools that are capable of performing plunge-type cutting much like a drill, or face-type milling like a conventional milling head, or even ramp-type machine operations that combine the motions of both plunge and face-type cutting. However, the cutting inserts used in conventional ball end mills have at most two cutting edges on one side of the cutting insert with the other side used strictly as a seating surface. As a result, one-half of the cutting insert is not being used, which increases the overall operating cost of such a conventional end mill.

BRIEF SUMMARY OF THE INVENTION

Briefly, according to another aspect of the invention, there is provided a cutting insert that is capable of being mounted within an insert-receiving pocket of a ball end mill. The cutting insert includes a first substantially planar surface, a second substantially planar surface, a first curvilinear side surface, a second curvilinear side surface, a first pair of cutting edges formed at an intersection between the first substantially planar surface and the first and second curvilinear side surfaces, and a second pair of cutting edges formed at an intersection between the second substantially planar surface and the first and second curvilinear side surfaces. The first substantially planar surface is substantially parallel to the second substantially planar surface.

According to another aspect of the invention, there is provided a cutting insert that is capable of being mounted within the insert-receiving pocket. The cutting insert includes a first substantially planar surface, a second substantially planar surface, a first curvilinear side surface, a second curvilinear side surface, a corner radius between the first and second curvilinear side surfaces. The cutting insert is mirror symmetric about all three central x-, y- and z-axis to form a first pair of cutting edges at an intersection between the first substantially planar surface and the first and second curvilinear side surfaces, and a second pair of cutting edges at an intersection between the second substantially planar surface and the first and second curvilinear side surfaces.

According to yet another aspect of the invention, there is provided a ball end mill comprising a body having a generally hemispherical forward end portion and a rearward end portion. The generally hemispherical forward end portion includes an insert-receiving pocket and a chip pocket. The insert-receiving pocket includes a bottom support surface, an axial support surface, a radial support surface, and a free surface between the axial support surface and the radial support surface. A cutting insert is capable of being mounted within the insert-receiving pocket. The cutting insert includes a first substantially planar surface, a second substantially planar surface, a first curvilinear side surface, a second curvilinear side surface, a corner radius between the first and second curvilinear side surfaces, a first pair of cutting edges formed at an intersection between the first substantially planar surface and the first and second curvilinear side surfaces, and a second pair of cutting edges formed at an intersection between the second substantially planar surface and the first and second curvilinear side surfaces.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a plan view of the cutting insert of FIG. 5 showing the first substantially planar surface;

FIG. 7 is a side view of the cutting insert of FIG. 5; and

FIG. 8 is another plan view of the cutting insert of FIG. 5 showing the second substantially planar surface.

DETAILED DESCRIPTION OF THE INVENTION

Figure 1:
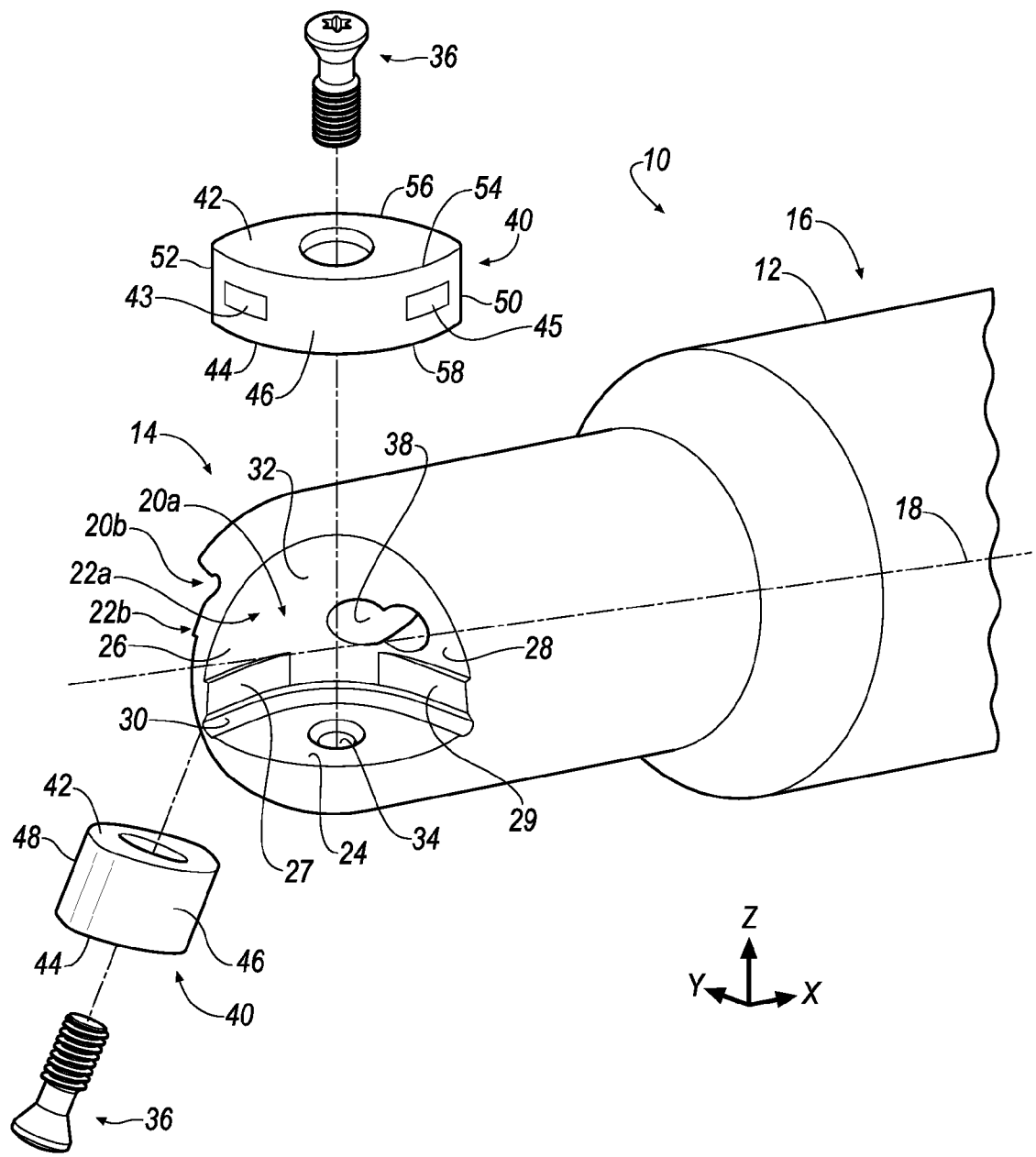
FIG. 1 is an exploded perspective view of a ball end mill and cutting inserts according to an embodiment of the invention.
Figure 2:
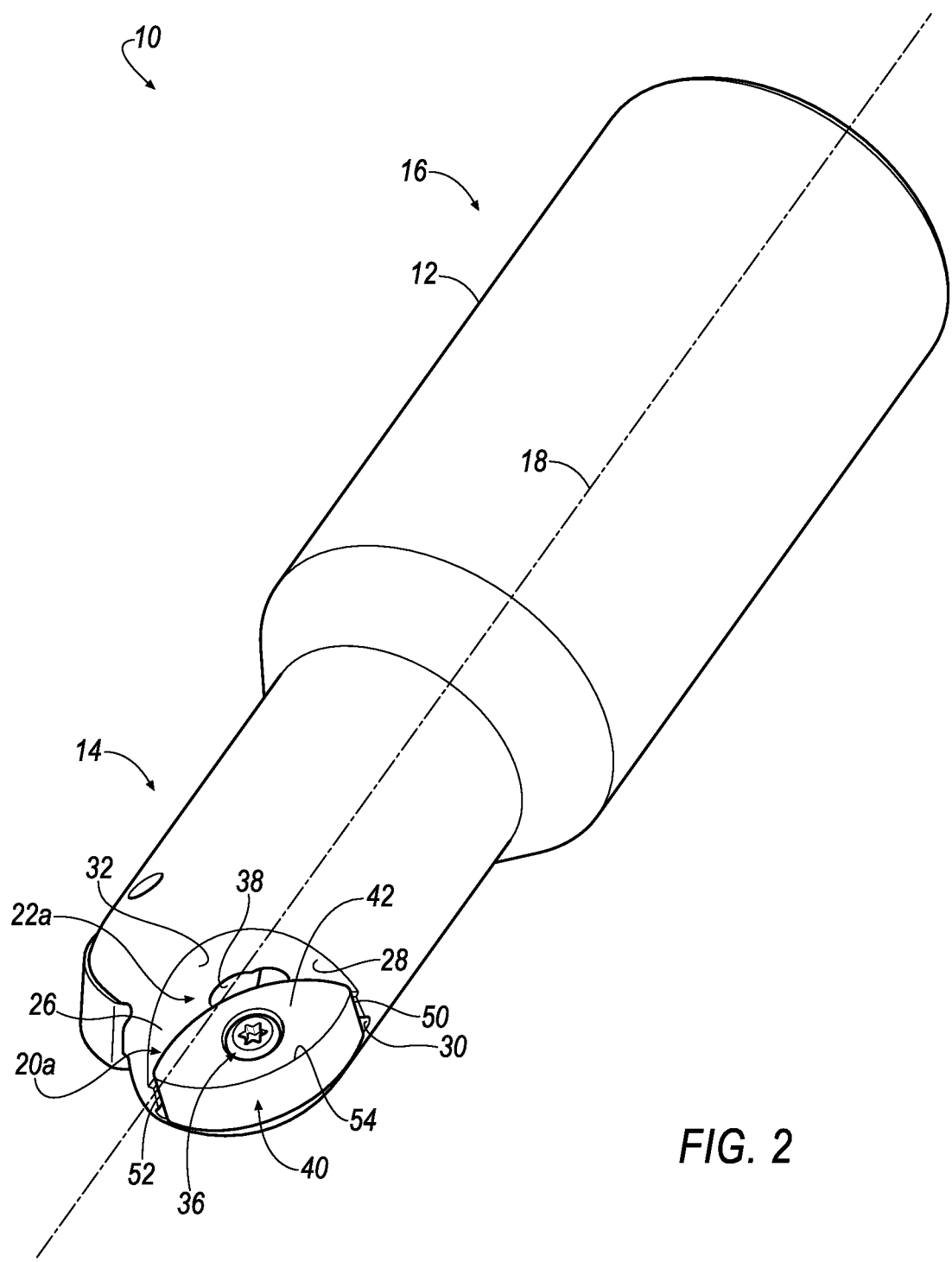
FIG. 2 is a perspective view of the ball nose end mill of FIG. 1.
Figure 3:
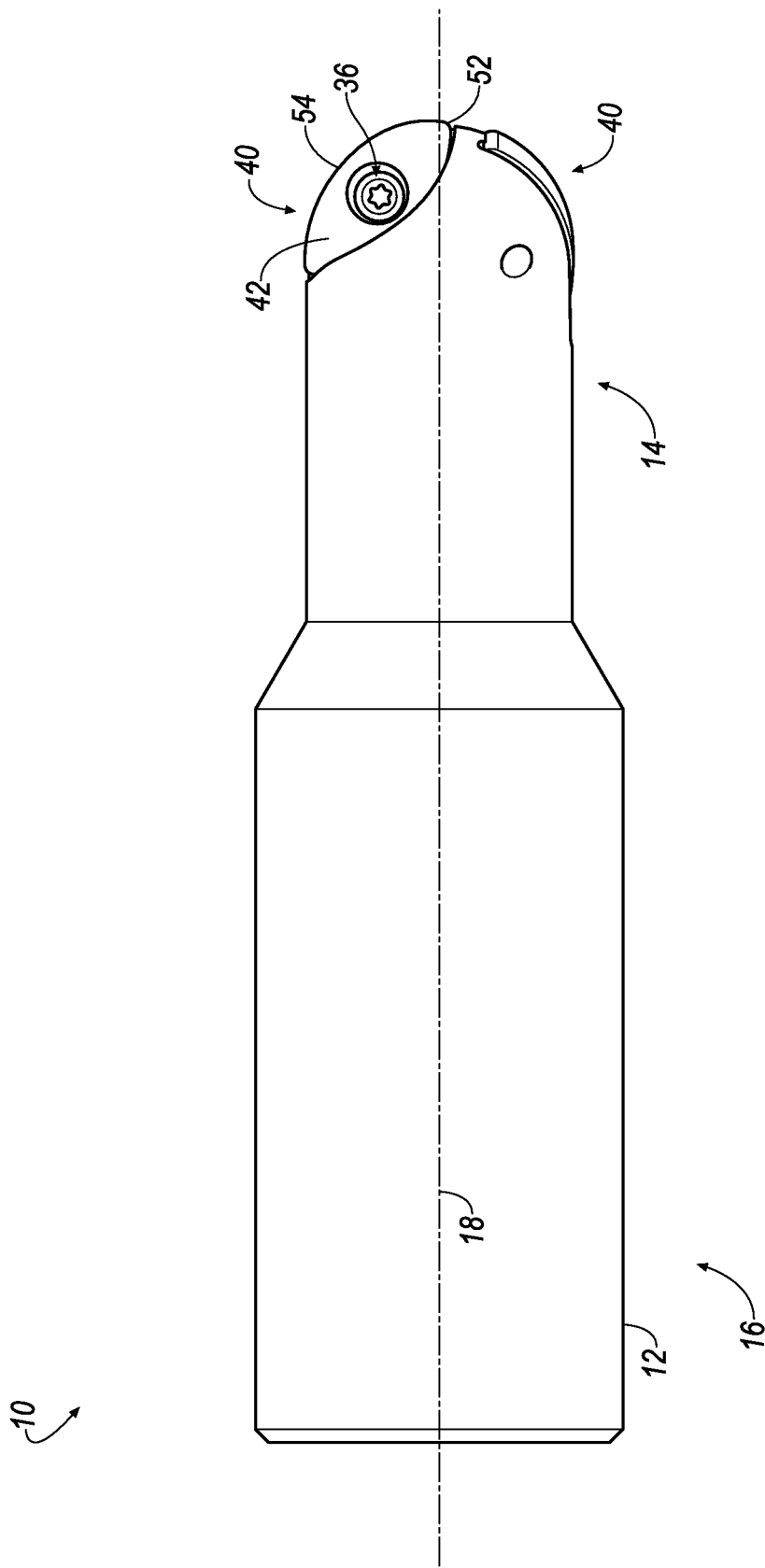
FIG. 3 is a front view of a body of the ball nose end mill of FIG. 1.
Figure 4:
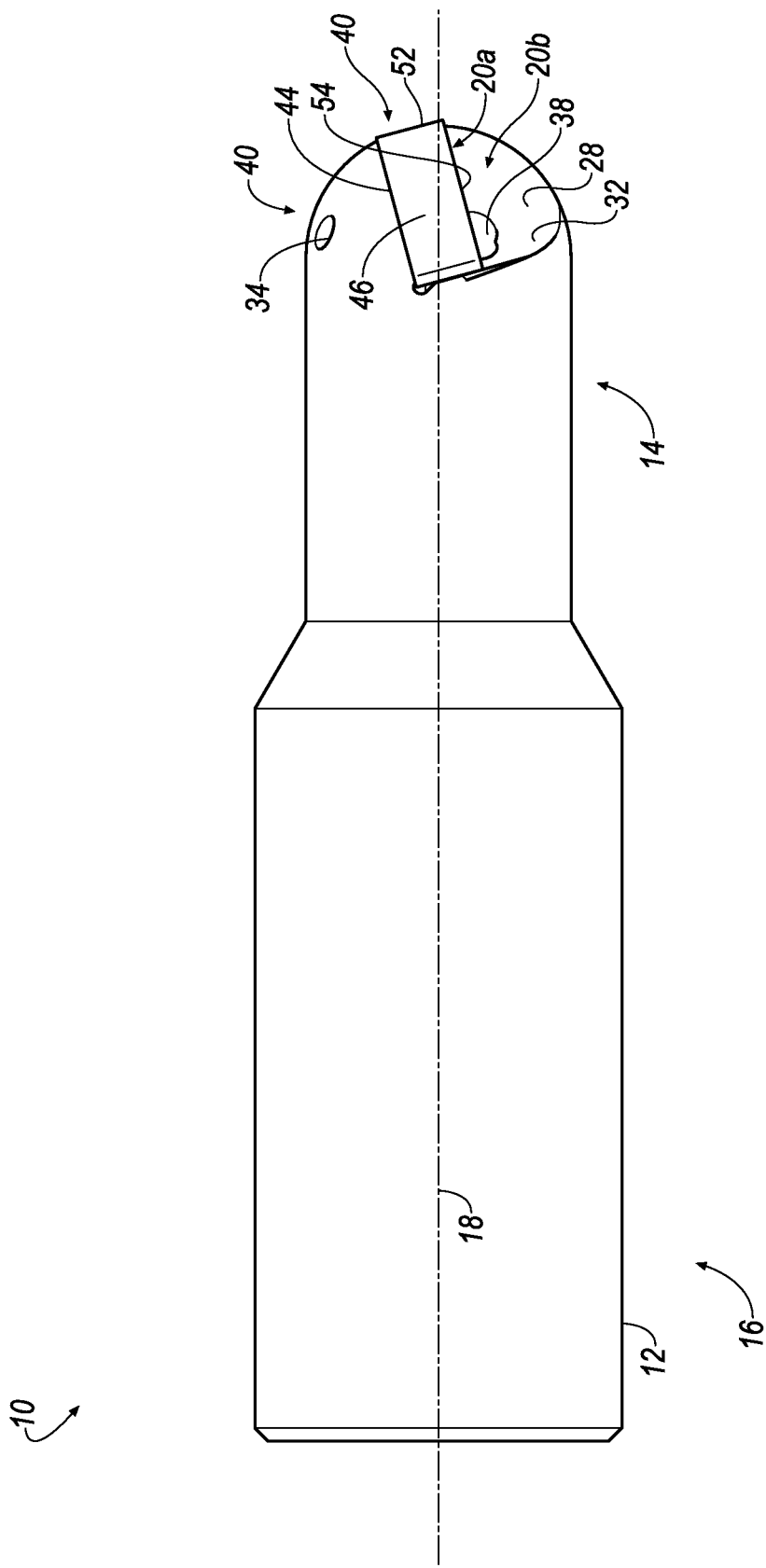
FIG. 4 is a side view of the body of the ball nose end mill of FIG. 1.
Figure 5:
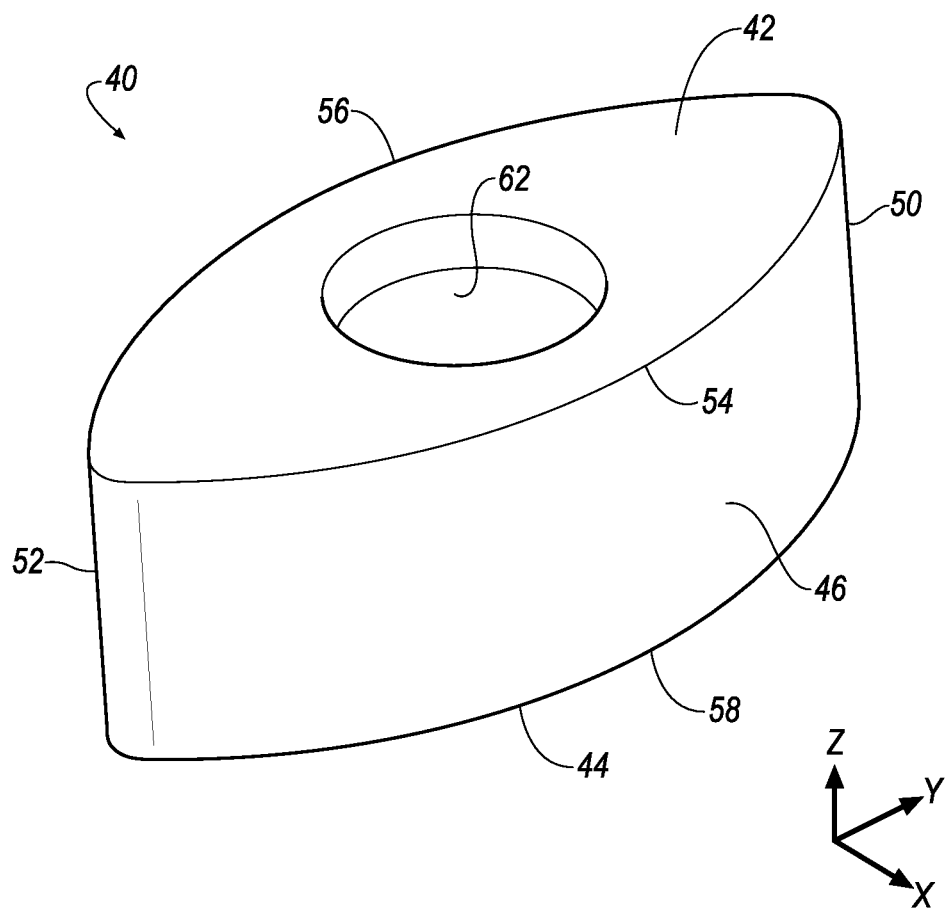
FIG. 5 is a perspective view of a cutting insert with four cutting edges according to an embodiment of the invention.

Referring now to FIGS. 1-4, a ball end mill is shown generally at 10 according to an embodiment of the invention. The ball end mill 10 includes a generally cylindrical body 12 having a generally hemispherical forward end portion 14 and a rearward end portion 16 that is adapted to be fixedly secured to a machine spindle (not shown) so that the body 12 can be rotated about an axis 18 therethrough.

The generally hemispherical forward end portion 14 may be intersectioned by two recesses, each one comprising an insert-receiving pocket 20a, 20b and a chip pocket 22a, 22b. In the illustrated embodiment, the insert-receiving pockets 20a, 20b and the chip pockets 22a, 22b are substantially identical in construction. Thus, only the insert-receiving pocket 20a and the chip pocket 22a will be described herein. The insert-receiving pocket 20a includes a bottom support surface 24, an axial side support surface 26 and a radial side support surface 28. A corner relief 30 is formed between the bottom support surface 24 and the axial and radial support surfaces 26, 28. A free surface 32 is provided between the axial and radial support surfaces 26, 28.

It will be appreciated that the invention is not limited by the number of insert-receiving pockets 20a, and that the invention can be practiced with any desirable number of insert-receiving pockets 20a. For example, the invention can be practiced with a ball end mill having only one insert-receiving pocket 20a, or a ball end mill having more than two insert-receiving pockets 20a.

In the illustrated embodiment, one or both of the side support surfaces 26, 28 includes a contact area 27, 29, respectively, that contacts a cutting insert 40 when the cutting insert 40 is mounted within the insert-receiving pocket 20a to provide three-point contact (the two contact areas 27, 29 and the bottom support surface 24) between the cutting insert 40 and the insert-receiving pocket 20a. In addition, a pair of contact areas 43, 45 may be located on each side surface 46, 48, respectively of the cutting insert 40 (a total of four contact areas) that correspond in shape to the contact areas 27, 29 formed on the axial and radial support surface 26, 28 of the insert-receiving pocket 20a. In one embodiment, the contact areas 27, 29 comprise pads or lands, while the contact areas 43, 45 comprise recesses or protrusions having a corresponding shape, such as a rectangle, and the like. One purpose of the contact areas 27, 29 and 43, 45 is to provide seat surfaces between the axial and radial support surface 26, 28 and the cutting insert 40 when the cutting inserts 40 is mounted in the insert-receiving pocket 20a. Another purpose of the contact areas 27, 29 and 43, 45 is to provide an anti-rotation feature that prevents unwanted movement of the cutting insert 40 when mounted in the insert-receiving pocket 20a.

In an alternate embodiment, a contact area (not shown) may be a protrusion extending from the bottom support surface 24 of the insert-receiving pocket 20a, and a contact area (not shown) having a corresponding shape formed on the substantially planar surfaces 42, 44 of the cutting insert 40. For example, the contact areas may be polygonal in cross-sectional shape, such as a triangle, square, rectangle, diamond, and the like. These contact areas on the bottom support surface 24 of the insert-receiving pocket 20a. Congruent recesses (not shown) may be located on the substantially planar surfaces 42, 44 of the cutting insert 40. These alternate contact areas may replace, or be in addition to, the contact areas 27, 29 and 43, 45 discussed above.

A threaded hole 34 is provided in the center area of bottom support surface 24 for accommodating a threaded screw 36, which provides a means for clamping a cutting insert, shown generally at 40, into the insert-receiving pocket 20a, 20b. The threaded hole 34 may be through holes or blind holes. In FIG. 1, the threaded hole 34 is shown as a through hole. One or more coolant passages 38 may be formed in the end mill body 12 to provide a flow of coolant to the area proximate the cutting insert 40.

Referring now to FIGS. 5-8, the cutting insert 40 includes a first substantially planar surface 42, a second, opposite substantially planar surface 44. As shown in FIG. 8, the plane of the first surface 42 is substantially parallel to the plane formed by the second surface 44. The cutting insert 40 includes a first curvilinear side surface 46 and a second curvilinear side surface 48, and a corner radius 50, 52 between the first and second curvilinear side surfaces 46, 48. As shown in FIGS. 6 and 7, the first and second side surfaces 46, 48 are substantially elliptical in shape. As shown in FIG. 8, the plane formed by the corner radius 50 is substantially parallel to the plane formed by the corner radius 52. The first and second side surfaces 46, 48 are formed at an angle of approximately ninety (90) degrees with respect to the first and second surfaces 42, 44.

A first pair of cutting edges 54, 56 is formed at the intersection between the first surface 42 and the first and second side surfaces 46, 48, and a second pair of cutting edges 58, 60 is formed at the intersection between the second surface 44 and the first and second side surfaces 46, 48. A countersunk bore 62 extends from the first surface 42 to the second surface 44 that enables the cutting insert 40 to be mounted in the insert-receiving pocket 20a such that all four cutting edges 54, 56, 58 and 60 can be used during machining operations.

As can be seen in FIGS. 5-8, the cutting insert 40 is mirror symmetric about all three central axes; the x-, y- and z-axis. Specifically, the x- and y-axes are substantially parallel to the first and second surfaces 42, 44, which the z-axis is substantially perpendicular to the first and second surface 42, 44. Because of this symmetry, the cutting insert 40 can be mounted in the insert-receiving pocket 20a such that the first surface 42 becomes the top surface and the second surface 44 becomes the bottom surface and engages the bottom support surface 24 and the first and second side surfaces 46, 48 engage the contact areas 27, 29 of the insert-receiving pocket 20a. When the cutting insert 40 is mounted in this manner, the cutting edges 54, 56 can be used in machining operations by rotating the cutting insert 40 about the z-axis 180°. In addition, the cutting insert 40 can be mounted in the insert-receiving pocket 20a such that the second surface 44 becomes the top surface and the first surface 42 becomes the bottom surface and engages the bottom support surface 24 and the first and second side surfaces 46, 48 engage the contact areas 27, 29 of the insert-receiving pocket 20a. When the cutting insert 40 is mounted in this manner, the cutting edges 58, 60 can be used in machining operations by rotating the cutting insert 40 about the z-axis 180°. Thus, the cutting insert 40 of the invention provides four (4) cutting edges that can be used in machining operations, as compared to only two or less cutting edges that are provided in conventional cutting inserts for ball end mills.

As described above, the ball end mill with two identical cutting inserts, wherein each cutting insert has four cutting edges that can cut in any direction without the requirement of error proofing when the cutting insert is mounted on the ball end mill.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A ball end mill, comprising:
   a body having a generally hemispherical forward end portion, a rearward end portion and a central axis, the generally hemispherical forward end portion including an insert-receiving pocket, the insert-receiving pocket including a bottom support surface, an axial support surface, a radial support surface, and a free surface between the axial support surface and the radial support surface; and
   a cutting insert including a first substantially planar surface, a second substantially planar surface, a first curvilinear side surface, a second curvilinear side surface, a corner radius between the first and second curvilinear side surfaces, a first pair of cutting edges formed at an intersection between the first substantially planar surface and the first and second curvilinear side surfaces, and a second pair of cutting edges formed at an intersection between the second substantially planar surface and the first and second curvilinear side surfaces, wherein the cutting insert is mirror symmetric about all three central x-, y- and z-axes, wherein the cutting insert is mounted in the insert-receiving pocket in such a way that at least a portion of the cutting insert lies along the central axis of the body.

2. A ball end mill according to claim 1, wherein the first substantially planar surface and the second substantially planar surface are substantially parallel to each other.

3. A ball end mill according to claim 1, wherein the insert-receiving pocket further includes a corner relief formed between the bottom support surface and the axial and radial support surfaces.

4. A ball end mill according to claim 1, wherein the cutting insert further includes a contact area for contacting the axial and radial side support surfaces of the insert-receiving pocket and preventing rotation of the cutting insert when mounted in the insert-receiving pocket.

5. A ball end mill according to claim 1, wherein the cutting insert further includes a contact area for contacting the axial and radial side support surfaces of the insert-receiving pocket and preventing rotation of the cutting insert when mounted in the insert-receiving pocket.

6. A ball end mill according to claim 1, wherein the generally hemispherical forward end further includes a chip pocket.

7. A ball end mill according to claim 1, further comprising one or more coolant passages formed in the body.

8. A ball end mill, comprising:
a body having a generally hemispherical forward end portion, a rearward end portion and a central axis, the generally hemispherical forward end portion including an insert-receiving pocket, the insert-receiving pocket including a bottom support surface, an axial support surface and a radial support surface, at least one of the axial support surface and the radial support surface having a contact area defined by a protrusion; and
a cutting insert including a first substantially planar surface, a second substantially planar surface, a first curvilinear side surface extending between the first and second substantially planar surfaces, a second curvilinear side surface extending between the first and second substantially planar surfaces, a corner radius between the first and second curvilinear side surfaces, at least one of the first curvilinear side surface and the second curvilinear side surface having at least one contact area defined by a recess that contacts the at least one contact area of the insert-receiving pocket when the cutting insert is mounted in the insert-receiving pocket, a first pair of cutting edges formed at an intersection between the first substantially planar surface and the first and second curvilinear side surfaces, and a second pair of cutting edges formed at an intersection between the second substantially planar surface and the first and second curvilinear side surfaces, wherein the cutting insert is mirror symmetric about all three central x-, y- and z-axes, wherein the cutting insert is mounted in the insert-receiving pocket in such a way that at least a portion of the cutting insert lies along the central axis of the body.

9. The ball end mill of claim 8, wherein the second curvilinear side surface has two contact areas and the first curvilinear side surface has two contact areas.

10. A ball end mill, comprising:
a body having a generally hemispherical forward end portion, a rearward end portion and a central axis, the generally hemispherical forward end portion including an insert-receiving pocket, the insert-receiving pocket including a bottom support surface, an axial support surface having a polygonal-shaped protrusion extending therefrom, and a radial support surface having a polygonal-shaped protrusion extending therefrom; and
a cutting insert including a first substantially planar surface, a second substantially planar surface, a first curvilinear side surface between the first and second substantially planar surfaces, a second curvilinear side surface between the first and second substantially planar surfaces and recesses, a corner radius between the first and second curvilinear side surfaces, a first pair of cutting edges formed at an intersection between the first substantially planar surface and the first and second curvilinear side surfaces, and a second pair of cutting edges formed at an intersection between the second substantially planar surface and the first and second curvilinear side surfaces, wherein the cutting insert is mirror symmetric about all three central x-, y- and z-axes, wherein the first curvilinear side surface and the second curvilinear side surface each has a recess corresponding in shape to the polygonal shaped protrusion of the insert-receiving pocket, whereby the polygonal shaped protrusion of the insert-receiving pocket mates with at least one of the recesses of the cutting insert to prevent rotational movement of the cutting insert when the cutting insert is mounted in the insert-receiving pocket, and wherein the cutting insert is mounted in the insert-receiving pocket in such a way that at least a portion of the cutting insert lies along the central axis of the body.

11. The ball end mill of claim 10, wherein the protrusions and recesses are triangular, square, rectangular, or diamond in cross-sectional shape.

* * * * *